US007241821B1

(12) United States Patent
Hayner et al.

(10) Patent No.: US 7,241,821 B1
(45) Date of Patent: Jul. 10, 2007

(54) POLYMER-MODIFIED, VULCANIZED ASPHALT COMPOSITION AND ITS METHOD OF PREPARATION

(75) Inventors: Roger E. Hayner, Hebron, KY (US); Patricia K. Doolin, Ashland, KY (US); Robert H. Wombles, Wexford, PA (US)

(73) Assignee: Marathon Ashland Petroleum LLC, Findlay, OH (US)

( * ) Notice: Subject to any disclaimer, the term of this patent is extended or adjusted under 35 U.S.C. 154(b) by 404 days.

(21) Appl. No.: 10/915,176

(22) Filed: Aug. 10, 2004

(51) Int. Cl.
*C08L 95/00* (2006.01)
(52) U.S. Cl. .............................. 524/68; 524/69; 524/70; 524/71
(58) Field of Classification Search ............. 524/68–71
See application file for complete search history.

(56) References Cited

U.S. PATENT DOCUMENTS

| | | | |
|---|---|---|---|
| 3,238,173 A | 3/1966 | Bailey et al. | |
| 3,992,340 A * | 11/1976 | Bonitz | 524/59 |
| 4,145,322 A | 3/1979 | Maldonado et al. | |
| 4,154,710 A | 5/1979 | Maldonado et al. | |
| 4,162,999 A | 7/1979 | Bohemen | |
| 4,237,052 A | 12/1980 | Fitoussi et al. | |
| 4,242,246 A | 12/1980 | Maldonado et al. | |
| 4,330,449 A | 5/1982 | Maldonado et al. | |
| 4,554,313 A | 11/1985 | Hagenbach et al. | |
| 4,567,222 A | 1/1986 | Hagenbach et al. | |
| 4,585,816 A | 4/1986 | Vitkuske et al. | |
| 5,023,282 A | 6/1991 | Neubert | |
| 5,039,342 A | 8/1991 | Jelling | |
| 5,118,733 A | 6/1992 | Gelles et al. | |
| 5,120,777 A | 6/1992 | Chaverot et al. | |
| 5,601,697 A | 2/1997 | Miller et al. | |
| 6,852,779 B1 * | 2/2005 | Planche et al. | 524/68 |

* cited by examiner

*Primary Examiner*—Peter Szekely
(74) *Attorney, Agent, or Firm*—Emch, Schaffer, Schaub & Porcello Co., L.P.A.

(57) ABSTRACT

A method is provided for improving high temperature performance grade properties of polymer-modified, vulcanized asphalt by treating an asphalt cement under mild oxidizing conditions sufficient to provide a change in viscosity per hour as measured at 140° C. of less than about 500 poises per hour, of said asphalt cement, adding 1 wt. % to 10 wt. % of a polymer based on weight of said asphalt cement, and vulcanizing the polymer-containing asphalt cement. The invention further relates to asphalt compositions thus made and paving compositions containing these asphalt compositions.

13 Claims, 1 Drawing Sheet

POLYMER-MODIFIED, VULCANIZED ASPHALT COMPOSITION AND ITS METHOD OF PREPARATION

FIELD OF THE INVENTION

The invention relates to polymer-modified, vulcanized asphalt compositions that exhibit improved performance grade specifications for high temperature properties. The invention further relates to a method of improving polymer efficiency in polymer-modified asphalts.

BACKGROUND OF THE INVENTION

It is known that adding polymer to asphalt improves the high temperature performance grade (PG) of paving asphalt cements as defined under the test methods established by the Strategic Highway Research Program (SHRP). Commonly used polymers include ethylene vinyl acetate (EVA) copolymers and styrene-butadiene-styrene triblock (SBS) copolymers. These polymers may be blended into the asphalt using high shear mix conditions to ensure proper dispersion of the polymer. Of the polymers used, SB or SBS polymers are preferred because of their compatibility with a large number of asphalts.

Blending crosslinkable polymers with paving asphalts produces a change in the viscoelastic behavior of the asphalt. The change in behavior can be attributed to the formation of a network structure as well as to an increase in viscosity and elasticity. The change in viscoelastic properties is related to the amount of polymer added. Network formation occurs above some finite polymer concentration. Thus, higher temperature PG grades are achieved as the polymer, e.g., SBS, concentration in the asphalt increases. However, the SBS is more costly than the asphalt, so for economic reasons, its use should be kept to a minimum. The amount of SBS polymer needed can be reduced by adding a vulcanizing (crosslinking) agent such as sulfur. The crosslinking agent allows the network structure to form at lower polymer concentrations. This improves polymer efficiency, reducing the amount of polymer needed to make specific grade of asphalt composition.

U.S. Pat. No. 4,145,322 to Maldonado et al. teaches that the addition of sulfur can improve the efficiency of the SB or SBS, decreasing the amount needed to achieve a desired grade. The sulfur is believed to act as a vulcanizing agent yielding crosslinks between the SB or SBS and asphalt. Typically, with sulfur crosslinking a 3% SBS/asphalt mixture has about the same SHRP high temperature PG grade as an uncrosslinked 5% SBS/asphalt mixture.

U.S. Pat. No. 5,601,697 to Miller et al., incorporated herein by reference, teaches SDA-produced asphalts made by blending SDA bottoms with an aromatic extract. Preferably, the aromatic extract is produced from an extraction process such as that employed in lubricating oil production. In one aspect, the SDA-produced asphalt can contain added polymers which can be vulcanized in situ with the asphalt by using sulfur and accelerators.

One drawback, however, is that polymer-modified asphalt compositions can suffer from a lack of homogeneity over long storage periods, particularly when stored at elevated temperatures. The polymer tends to separates out from the asphalt composition on standing resulting in loss of properties imparted by cross-linking of the polymers.

Accordingly, it would be desirable to not only improve the useful temperature index of an asphalt composition, but improve its storage stability as well.

SUMMARY OF THE INVENTION

The present invention relates to a novel method for preparing a polymer-modified, vulcanized asphalt composition which comprises i) treating an asphalt cement under mild oxidizing conditions sufficient to provide a change in viscosity per hour as measured at 140° C. of less than 500 poises per hour, preferably from 300 to 400 poises per hour (and as shown in FIG. 1, in certain embodiments, about 120 or less poise per hour), of said asphalt cement, ii) adding 1 wt. % to 10 wt. % of a polymer based on weight of said asphalt cement, and iii) vulcanizing the polymer-containing asphalt cement by adding sulfur and exposing to vulcanizing conditions.

In another aspect, the present invention relates to a polymer modified, vulcanized asphalt composition comprising a mixture containing i) at least 80 wt. % of an asphalt cement selected from the group consisting of natural asphalts and synthetic asphalts, which asphalt cement has been mildly oxidized under oxidizing conditions sufficient to provide a change in viscosity per hour of said asphalt cement as measured at 140° C. of from 100 to 500 poises per hour; and ii) from about 1 wt. % to about 10 wt. % cross-linkable polymer based on weight of said asphalt cement, to provide a polymer-containing asphalt cement which is thereafter treated by vulcanizing.

In yet another aspect, the present invention relates to a pavement composition comprising i) an aggregate or aggregate material and ii) from about 1.0 wt. % to about 10.0 wt. % of the asphalt composition described above.

The present invention is useful to prepare a wide variety of asphalt materials including asphalt pavement compositions, roofing asphalt compositions, coatings, sealants, adhesives, and sound deadeners.

Asphalt Cement (Petroleum Bitumens)

The asphalt composition of the present invention contains a natural or synthetic asphalt cement component. Such asphalt cement component can have a viscosity of 100 to 5000 poise at 60° C. (140° F.), preferably 250 to 4000 poise, e.g., 2000 poise for AC20 asphalt cement, and 500 poise for AC5 asphalt cement. The asphalt cement component is added in amounts sufficient to provide the resulting asphalt composition with the desired viscosity for the intended application, e.g., 2000 poise at 60° C. (140° F.) for paving applications. For Performance Graded Applications, the asphalt compositions can have a G*/sin delta value in excess of 1.0 kPa at temperatures ranging from 46 to 82° C., preferably 52° C. to 76° C. Generally, the asphalt compositions of the present invention contain at least 80 wt. %, preferably from 80 wt. % to 98.9 wt. %, e.g., 90 wt. % to 95 wt. %, of such asphalt cement component. The asphalt cement component can be obtained from any suitable source, e.g., atmospheric distillation bottoms or vacuum tower bottoms. The asphalt used in the present invention can be a natural asphalt or a synthetic asphalt.

Natural asphalt can be obtained from crude petroleum, bituminous schists, heavy oils, bituminous sands or coal. Natural asphalt can be, for example: a) the heaviest fraction obtained by direct distillation of crude petroleum at atmospheric or reduced pressure; b) the heavy phase obtained by solvent-deasphalting a heavy fraction as obtained under a); c) the product of oxidation, in the presence or absence of a catalyst, of a heavy fraction as obtained under a) or of a heavy phase as obtained under b); d) the product of oxidation, in the presence or absence of a catalyst, of a blend of a heavy fraction as obtained under a) or of a heavy phase as obtained under b) and a distillate or an aromatic extract obtained in the dearomatization of lubricating oils, or a deasphalting pitch; e) a blend of an oxidized product obtained as under c) and d) or of a hard phase and a distillate, or an aromatic extract obtained in the dearomatization of lubricating oils, or a deasphalting pitch, or a heavy fraction as obtained under a) or a heavy phase as obtained under b); f) a visbroken base, alone or in admixture with one or more of the above said products; g) one of the products as obtained under a) to f) in admixture with a distillate, or an aromatic extract obtained in the dearomatiziation of lubricating oils, or a deasphalting pitch, or a heavy aromatic fraction (catalytic slurry) obtained from a catalytic cracking process.

Suitable synthetic asphalts have properties similar to those of the above-described natural asphalts, for example, clear synthetic binders that can be colored by addition of pigments. Such asphalts can comprise, for example, of petroleum resins or indeno-coumarone resins blended with aromatic and/or paraffinic hydrocarbons. Such petroleum resins can be prepared by polymerization of unsaturated hydrocarbons present in unsaturated petroleum fractions, such as the fractions obtained by thermal or steam cracking or by pyrolysis. The indene-coumarone resins are generally obtained from coal tars.

As used herein, the terms "asphalt composition", "asphalt cement" or "asphalt binder" are understood to refer to any of a variety of organic materials, solid or semi-solid at room temperature, which gradually liquefy when heated, and in which the predominate constituents are naturally occurring bitumens, e.g., Trinidad Lake, or residues commonly obtained in petroleum, synthetic petroleum, or shale oil refining, or from coal tar or the like. A "paving asphalt composition", "paving asphalt cement", or "paving asphalt binder", accordingly is an asphalt composition or asphalt cement having characteristics which dispose the composition to use as a paving material, as contrasted, for example, with an asphalt composition suited for use as a roofing material. "Roofing asphalts" for example, usually have a higher softening point, and are thus more resistant to flow from heat on roofs, the higher softening point generally being imparted by air blowing processes by which they are commonly produced. Paving asphalt mixtures may be formed and applied in a variety of ways, as well understood by those skilled in the art. For example, the paving asphalt composition and the aggregate can be mixed and applied at elevated temperatures at the fluid state of the paving asphalt composition to form the pavement or road surface.

In one aspect, the present invention can employ as the asphalt cement component a mixture comprising asphalt cement such as vacuum tower bottoms whose viscosity is increased by adding solvent deasphalting bottoms. For example, products disclosed in U.S. Pat. No. 5,601,697 to Miller et al., containing an asphalt cement component such as vacuum bottoms as well as solvent deasphalting bottoms and aromatic extract can be used. Preferably, the aromatic extract is produced from an extraction process such as that employed in lubricating oil production.

Oxidizing Conditions:

The asphalt cement component is subjected to oxidizing conditions. Prior to oxidizing, the asphalt cement component can be preheated to temperatures ranging from 20° to 180° C., preferably 50° to 165° C., and may be held at such temperatures from 0.1 to 24 hours, preferably from 1 to 10 hours. The preheating step can be carried out under mixing conditions to effect more even heat transfer.

Oxidizing can be carried out by exposing the asphalt cement to oxidizing agents such as oxygen, air, or oxidizing agents such as peroxides, etc. Preferably, such oxidizing is carried out by heating the mixed asphalt cement to temperatures ranging from 100° to 400° C. (212° to 752° F.), preferably 150° to 260° C. (300° to 500° F.), and forcing oxygen-containing gas, e.g., air through the blend. The oxidizing step can be conducted using air flow rates of 1 to 10 standard cubic feet per hour (SCFH), preferably 2 to 5 SCFH for 0 1 to 50 hours, preferably 2 to 5 hours. Oxidizing can be carried out until a desired change in viscosity of less than 500 poises per hour measured @ 140° C., preferably less than 400 poises per hour, and in certain embodiments, less than about 100 poise per hour.

After subjecting the asphalt cement component to oxidizing conditions, additional components are added to the blend as discussed below.

Crosslinkable Polymers

The present invention adds crosslinkable polymers to the blended asphalt products of the present invention. While the invention is not to be limited to any theory, these polymers apparently cause polymeraization with the natural or synthetic asphalts of the invention. Suitable crosslinkable polymers include, styrene-butadiene (SB) diblocks, styrene-isoprene-styrene (SIS) triblocks, and styrene-butadiene-styrene (SBS) triblocks, such as those taught in U.S. Pat. No. 3,238,173 to Bailey (Shell); U.S. Pat. No. 4,145,322 to Maldonado et al. (Elf) (block copolymer with an average molecular weight between 30,000 and 3000,000 having the theoretical formula $S_x$—$B_y$, in which S corresponds to styrene structure groups, and B corresponds to conjugated diene structure groups and x and y are integers); U.S. Pat. No. 4,154,710 to Maldonado et al. (Elf) (thermoplastic elastomer having a molecular weight between 100,000 and 2,000,000, e.g. polyisobutenes, styrene-butadiene rubber (SBR), polychloroprene, isobutene-isoprene copolymers, halogenated or non-halogenated, ethylene-propylene-diene terpolymers (EPDM), ethylene-propylene copolymers (EPR), ethylene-cyclopentadiene copolymers, polybutadienes, and polynorbornenes); U.S. Pat. No. 4,162,999 to Bohemen (British Petroleum); U.S. Pat. No. 4,237,052 to Fitoussi et al. (Elf) (dihalopolybutadiene polymer and triblock copolymer with a linear or cyclic structure of a molecular weight within the range of 100,000 and 300,000); U.S. Pat. No. 4,242,246 to Maldonado (Elf) (polystyrene-polydience disequenced, multisequenced, or statistical copolymer); U.S. Pat. No. 4,330,449 to Maldonado et al. (Elf) (polyblock copolymer of a styrene-carboxylated conjugated diene having a mean molecular weight of 30,000 to 300,000); U.S. Pat. No. 4,554,313 to Hagenbach (Elf (styrene-conjugated diene copolymer); U.S. Pat. No. 4,567,222 to Hagenback (Elf; U.S. Pat. No. 4,585,816 to Vitkuske (Dow Chemical); U.S. Pat. No. 5,023,282 to Neubert (GenCorp); U.S. Pat. No. 5,039,342 to Jelling (National Patent Development); U.S. Pat. No. 5,118,733 to Gelles (Shell); and U.S. Pat. No. 5,120,777 to Chaverot (Elf; (diene/vinyl aromatic block copolymers, e.g. methylstyrene, tertiary butyl styrene, etc.). It is especially preferred to add styrene-butadiene (SB) diblock copolymers or styrene-butadience styrene (SBS) triblock copolymers to the blended asphalt products of the present invention. The preferred amount of the polymer introduced into the asphalt ranges from about 1 wt. % to 10 wt. %, preferably 2 wt. % to 5 wt. %, for example, 3 wt. % to 4 wt. % based on asphalt cement content.

Vulcanization

The conditions for treatment with reactive sulfur comprise heating at temperatures of 100° to 300° C. (220° to 572° F.), preferably 110° to 250° C. (230° to 482° F.), for 0.1 to 5 hours, preferably 0.2 to 2 hours, e.g., 0.5 to 0.8 hour.

Reactive sulfur utilized in the present invention can be added to the mixture in the form of elemental sulfur, including sulfur recovered from the refining process of crude oils, or in the form of reactive sulfur compounds, e.g., polysulfides, in amounts of 0.05 to 1.0 wt % sulfur, preferably 0.1 to 0.5 wt % sulfur, e.g., 0.05 to 0.2 wt %. Sulfur compounds in which the sulfur is tightly bound and thus unreactive under the treatment conditions set out above are not suited to use in the present invention vulcanization.

DESCRIPTION OF THE PREFERRED EMBODIMENTS

Figure 1:
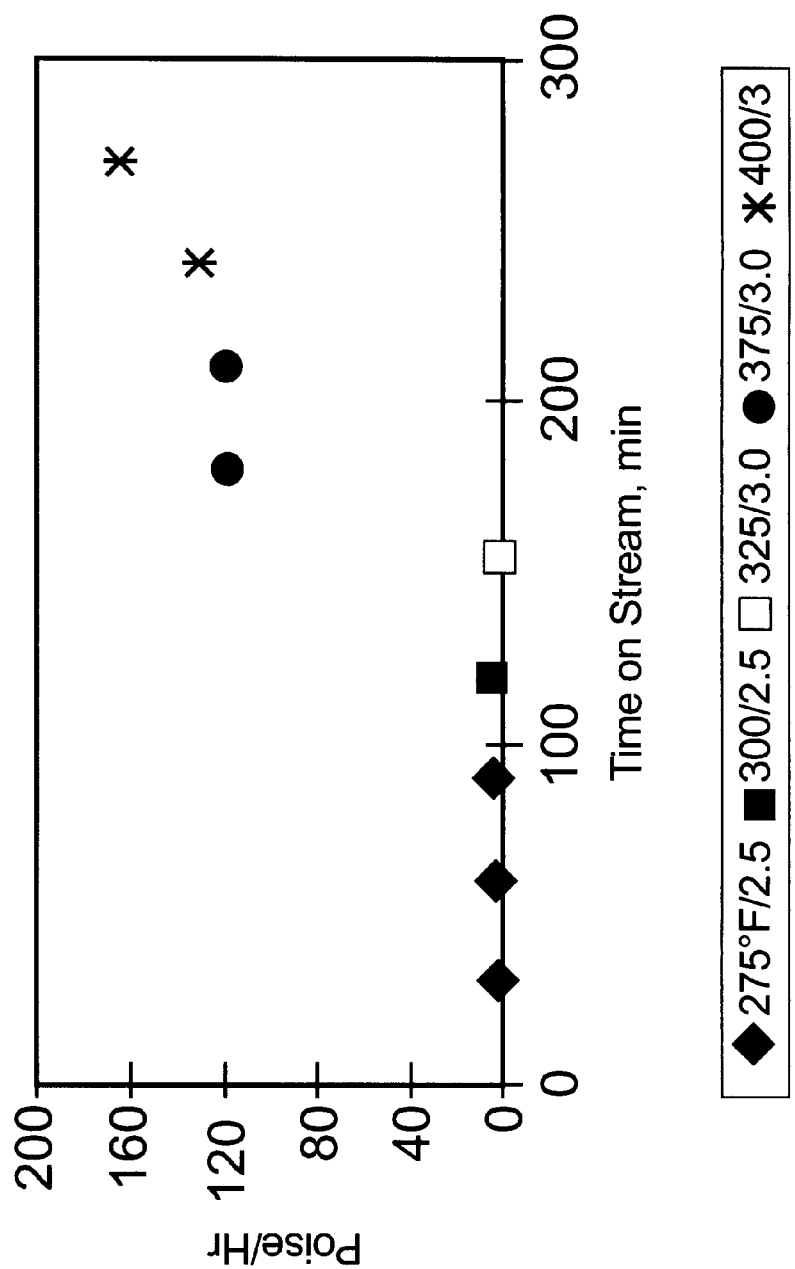
FIG. 1 is a graph showing the mild oxidation of an AC-5 asphalt at different temperatures and the change in viscosity over time at certain stream rates.

As a result of the 1987 Intermodal Surface Transportation Efficiency Act (ISTEA), a $150 million research study was commissioned in which $50 million was spent towards asphalt research for improving asphalt pavements. As a product of that research which was concluded in 1992, the Strategic Highway Research Program (SHRP) produced what is now known as the Superpave Performance Graded Binder Specification in which asphaltic binders are graded or characterized according to their relative performance in resistance to rutting, shoving or deformation at high temperatures, fatigue at intermediate temperatures, and thermal cracking resistance at low temperatures. Asphalts which normally would be graded either under the penetration or viscosity specifications will now be graded as PG or Performance Graded binders. As such, their designation will be representative of their resistance at both high and low temperature, indicating their useful temperature range as a PG M-BB where AA=high temperature resistance in degrees Celsius and BB is low temperature cracking resistance in minus degrees Celsius, i.e., i.e., PG 64-22 would prevent rutting up to 64° C. (147° F.) and low temperature cracking to a minus 22° C. (−7.6° F.). Useful temperature index (UTI) is the difference between M and BB such that a PG 64-22 material would have a UTI of 64-(−22), i.e., 86.

Areas of high loading or slow or standing traffic as well as areas where temperature extremes can be experienced will require binders having a UTI in excess of 86° C. (155° F.) between high and low temperature levels will require the use of modifiers to obtain the increased useful temperature range. As a result, it has been common to add or start with softer asphalts to reach low temperature properties while adding modifiers such as polymers to achieve high temperature rutting resistance. The present invention provides a method for providing improved paving asphalt compositions by providing asphalts of increased useful temperature index (UTI) as a result of improving polymer efficiency.

In the process of the invention, the natural or synthetic asphalt cements employed are heated to a temperature in the range of 200° F. to 500° F. (93° C. to 260° C.), preferably 300° F. to 400° F. (149° C. to 204° C.). After oxidizing, the crosslinkable polymer, e.g., SBS copolymer, added in amounts ranging from 1 to 10 wt. % of the asphalt cement (petroleum bitumen) component is dispersed in the asphalt using a high or low shear mixer. Mixing time is adjusted to ensure complete dispersion of the crosslinkable polymer. Other polymers may be added including EVA, ethylene homo- and co-polymers and the like. The asphalt may be kept as 300° F. to 400° F. (149° C. to 204° C.) for an additional 4 to 240 hours with or without stirring. Finally, the polymer modified asphalt is graded using the test procedures outlined in SHRP and adopted by American Association of State Highway and Transportation Officials, MSHTO, in their MP-1 Standard Test Method, "Superpave/Performance Graded Asphalt Binder Specification and Testing reference manual," Superpave Series No. 1 (SP-1), available from Asphalt Institute, Lexington, Ky. (1997). The specifications are also set out in U.S. Pat. No. 5,601,697 to Miller.

The following Examples are to be considered illustrative of comparative products and Examples of the present invention. Table 1 shows "Mild oxidation" data for various comparative materials, Table II shows Mild oxidation for materials having sulfur added either in the oxidized material (Compar. 3) or sulfur added after the pre-oxidation step (Ex. 1 and Ex. 2), and Table III which shows AC-20 mild oxidation with a polymer and sulfur added either pre- (Ex. Compar. 4) or post-oxidation (Ex. 1 and Ex. 4).

TABLE I

Mild Oxidation

| Sample | Asphalt | PG Grade | Actual Grade | UTI |
|---|---|---|---|---|
| Compar. Ex. 1 | Neat | 64-22 | 65.0-23.5 | 88.5 |
| Compar. Ex. 1A | +3% E6302 | 70-22 | 72.5-23.7 | 96.2 |
| Compar. Ex. 2 | Ox AC-20 | 64-22 | 67.8-24.8 | 92.6 |
| Compar. Ex. 2A | +3% E6302 | 70-22 | 75.9-23.5 | 99.4 |

TABLE II

Mild Oxidation w Sulfur

| Sample | 3% E6302 0.1% S | Pre-Oxid | PG Grade | Actual Grade | UTI | Viscosity Centipoise |
|---|---|---|---|---|---|---|
| Compar. Ex. 3 | AC-20 | None | 70-28 | 75.2-29 | 104.2 | |
| Ex. 1 | AC-20 | With | 76-22 | 79.8-27.0 | 106.8 | 1450 @ 135° F. |
| Ex. 2 | AC-20S | With | 70-22 | 75.5-25.4 | 100.9 | 955 |

TABLE III

AC-20 Mild Oxidation

| Sample | 3 wt % E6302 | Vulcanization 0.1 wt % S | Vis @ 135 Cps | Actual Grade | PG Grade | UTI |
|---|---|---|---|---|---|---|
| Ex. 1 | Post | Post | 1450 | 79.8-27.0 | 76-22 | 106.8 |
| Compar. Ex. 4 | Pre | Post | 793 | 72.3-26.5 | 70-22 | 98.8 |
| Compar. Ex. 4A | Pre | Pre | 998 | 73.9-27.4 | 70-22 | 101.3 |
| Ex. 3 | Post | Post | None - no aging | 75.2-28.4 | 70-28 | 103.6 |
| Agitated/ 340° | | | F/N$_2$ blanket - 24 hour aging | 76.0-28.2 | 70-28 | 104.2 |

TABLE III-continued

AC-20 Mild Oxidation

| Sample | 3 wt % E6302 | Vulcan- ization 0.1 wt % S | Vis @ 135 Cps | Actual Grade | PG Grade | UTI |
|---|---|---|---|---|---|---|
| Agitated/ 340° | | | F/N₂ blanket - 48 hour aging | 78.3-28.2 | 70-28 | 106.5 |

COMPARATIVE EXAMPLE 1

A sample of AC-20, asphalt cement having a viscosity of 2000 poise was performance graded and exhibited a grade of PG64-22, an actual grade of 65.0-23.5 and a useful temperature index (UTI) of 88.5.

COMPARATIVE EXAMPLE 1A

3 Weight percent of E6302, a linear triblock copolymer available from Enichem Elastomers was added to the AC-20 sample of Comparative Example 1 and performance graded. The polymer-modified sample was rated as a PG70-22, had an actual SHRP grade of 72.5-23.7 and a UTI of 96.2.

COMPARATIVE EXAMPLE 2

The AC-20 sample of Comparative Example 1 was preheated overnight at 325° F. and then oxidized at 350° F. for 75 minutes by injecting air at rate of 3.0 SCFH (space cubic feet per hour). The mildly oxidized sample was rated as a PG64-22, had an actual SHRP grade of 67.8-24.8 and a UTI of 92.6.

COMPARATIVE EXAMPLE 2A

3 Weight percent of E6302, a linear triblock copolymer was added to the AC-20 sample of Comparative Example 2 and performance graded. The polymer-modified sample was rated as a PG70-22, had an actual SHRP grade of 75.9-23.5 and a UTI of 99.4.

COMPARATIVE EXAMPLE 3

The non-oxidized, polymer-modified AC-20 sample of Comparative Example 1A was vulcanized by adding 0.1 wt. % S. The vulcanized product exhibited a PG Grade of 70-28 an actual grade of 75.2-29 and a UTI of 104.2.

EXAMPLE 1

The oxidized, polymer-modified AC-20 sample (preheated at 325° F., oxidized at 350° F. for 75 minutes by injecting air at rate of 3.0 SCFH, then added 3%, by wt., E6302 linear triblock copolymer) of Comparative Example 2A was vulcanized by adding 0.1 wt. % S and agitating the resulting mixture in a stirred tank under a nitrogen blanket at a temperature of about 340-475° F. (160-240° C.). The heat aged samples exhibited no crusting or separation of polymer and performance improved with heat aging. The vulcanized product exhibited a PG Grade of 76-22, an actual grade of 79.8-27.0 and a UTI of 106.8, a viscosity of 1450 centipoise @ 135° F.

EXAMPLE 2

An AC20 asphalt cement material similar to Ex. 1 was prepared. The resulting product had a PG Grade of 70-22, an Actual Grade of 75.5-25.4 and a UTI of 100.9.

COMPARATIVE EXAMPLE 4

Example I was repeated except that the vulcanization step was carried out after the oxidation step and the polymer added before the oxidation step. The resulting product had a viscosity @135° F. of 793 cps, a PG Grade of 70-22 and an Actual Grade of 72.3-26.5.

COMPARATIVE EXAMPLE 4A

Example I was repeated except that both polymer addition and vulcanization step were carried out before the oxidation step. The resulting product had a viscosity @ 135° F. of 998 cps, a PG Grade of 70-22 and an Actual Grade of 73.9-27.4.

Asphalt paving compositions of the present invention exhibit a distinct improvement in useful temperature index (UTI) as defined by the Superpave Performance Graded (PG) Asphalt Binder Specifications, AASHTO MR.

EXAMPLE 3

An AC20 asphalt cement material was lightly oxidized at 350-365° F. for 1½ hours by adding 3.0 SCFH of air, 0.1% sulfur and 3 wt. % Enichem's linear triblock polymer E6302 were added and the resulting mixture was mixed for 1 hour at 340-360° F. at 3200 rpm on a Ross homongenizer (under a $N_2$ blanket) heat was cut, then mixed for 30 minutes at 500 rpm. The resulting product had a PG Grade of 70-28, an Acutal Grade of 75.2-28.4 and a UTI of 103.6. The product thereafter placed in a stirred tank and kept at 340° F. with agitation under a nitrogen blanket. Samples taken after 24 and 48 hours exhibited PG Grade grades of 70-28 and Actual Grades of 76.0-28.2 (24 hours) and PPG 78.3-28.2 (48 hours), and UTI's of 104.2 (24 hours) and 106.5 (48 hours), respectively. The heat aged samples exhibited no crusting or separation of polymer. Performance actually improved upon heat aging (stirring in inert atmosphere).

Modifications

Specific compositions, methods, and embodiments discussed are intended to be only illustrative of the invention disclosed by this specification. Variations on these compositions, methods, or embodiments are readily apparent to a person of skill in the art based upon the teachings of this specification and are therefore intended to be included as part of the inventions disclosed herein.

Reference to documents made in the specification is intended to result in such patents or literature being expressly incorporated herein by reference including any patents or other literature references cited within such documents.

We claim:

1. A method for preparing a polymer-modified, vulcanized asphalt composition comprising
   i) treating an asphalt cement under mild oxidizing conditions sufficient to provide a change in viscosity as measured at 140° C. from 100 to 500 poises per hour of said asphalt cement,
   ii) adding from about 1 wt. % to about 10 wt. % of a polymer based on weight of said asphalt cement, iii) vulcanizing the polymer-containing asphalt cement, wherein said asphalt cement is selected from the group consisting of natural asphalts and synthetic asphalts, the polymer comprising a linear block copolymer added in amounts ranging from about 1 wt. % to about 5 wt. %;

iv) maintaining said asphalt cement at temperatures ranging from 100° to 400° C. and injecting air to said asphalt cement at about 1 to about 10 SCFH, for 0.1 to 5 hours, and wherein said vulcanizing is carried out by adding about 0.01 wt. % to about 1 wt. % sulfur based on said asphalt cement content to provide a sulfur-containing mixture and maintaining the resulting mixture at a temperature ranging from about 150° to about 240° C. for about 0.5 to about 2 hours.

2. The method of claim 1, wherein said mild oxidizing conditions are sufficient to provide a change in viscosity as measured at 140° C. from 300 to 500 poises per hour, of said asphalt cement.

3. A method for preparing a polymer-modified, vulcanized asphalt composition comprising i) treating an asphalt cement under mild oxidizing conditions sufficient to provide a change in viscosity as measured at 140° C. of 100 to 500 poises per hour of said asphalt cement, ii) adding from about 1 wt. % to about 10 wt. % of a polymer based on weight of said asphalt cement and, iii) vulcanizing the Polymer-containing asphalt cement, wherein said oxidizing conditions comprise maintaining said asphalt cement at temperatures ranging from 150° to 260° C. and injecting air to said asphalt cement at 2 to 5 SCFH, for 0.5 to 3 hours, said polymer is selected from the group consisting of styrene-butadiene diblock copolymer (SB), styrene-isoprene-styrene triblock copolymer (SIS), and styrene-butadiene-styrene triblock copolymer (SBS), said polymer being added in amounts ranging from 3 to 4 wt. % of said asphalt cement, and said vulcanizing being carried out by adding from about 0.1 wt. % to about 0.5 wt. % sulfur based on said asphalt cement content to provide a sulfur-containing mixture and maintaining the resulting mixture at a temperature ranging from about 150° to about 240° C. for about 0.5 to about 2 hours.

4. The method of claim 1, wherein said asphalt cement comprises at least 80 wt. % of said asphalt composition and comprises a petroleum bitumen.

5. The method of claim 1, wherein said asphalt cement comprises about 80 wt. % to about 98.9 wt. % of said asphalt composition.

6. The method of claim 1, wherein said asphalt cement comprises solvent deasphalting bottoms.

7. The method of claim 1, wherein said asphalt cement comprises solvent deasphalting bottoms and aromatic extract.

8. The method of claim 1, wherein said sulfur is added as elemental sulfur.

9. The method of claim 1, wherein said sulfur is added as a sulfur compound.

10. The method of claim 1 wherein said mild oxidizing conditions are sufficient to provide a change in viscosity as measured at 140° C. from 300 to 400 poises per hour, of said asphalt cement.

11. The method of claim 1 wherein said mild oxidizing conditions are sufficient to provide a change in viscosity as measured at 140° C. of 120 poises per hour, of said asphalt cement.

12. A polymer-modified, vulcanized asphalt composition produced by the method of claim 1.

13. A polymer-modified, vulcanized asphalt composition produced by the method of claim 3.

* * * * *